United States Patent [19]

Blike et al.

[11] Patent Number: 4,972,495
[45] Date of Patent: Nov. 20, 1990

[54] FEATURE EXTRACTION PROCESSOR

[75] Inventors: James J. Blike, Collegeville; Mark S. Horwedel, Willow Grove; Janet L. Rimlinger, Collegeville; Ricky S. Blum, Philadelphia, all of Pa.

[73] Assignee: General Electric Company, Philadelphia, Pa.

[21] Appl. No.: 287,176

[22] Filed: Dec. 21, 1988

[51] Int. Cl.⁵ ............................................... G06K 9/00
[52] U.S. Cl. ........................................ 382/22; 382/47; 382/42; 382/49; 364/133; 364/715.08; 364/728.02
[58] Field of Search .................. 382/49, 22, 44, 45, 382/46, 27, 55, 41; 364/133, 715.08, 728.02, 726, 736; 340/721

[56] References Cited
U.S. PATENT DOCUMENTS

| | | | |
|---|---|---|---|
| 4,065,808 | 12/1977 | Schomberg et al. | 364/200 |
| 4,215,401 | 7/1980 | Holsztynski et al. | 364/200 |
| 4,484,265 | 11/1984 | Czekalski | 364/200 |
| 4,484,349 | 11/1984 | McCubbrey | 382/49 |
| 4,493,105 | 1/1985 | Beall et al. | 382/21 |
| 4,499,598 | 2/1985 | Chittineni | 382/54 |
| 4,509,043 | 4/1985 | Mossaides | 340/721 |
| 4,519,041 | 5/1985 | Fant et al. | 364/552 |
| 4,550,437 | 10/1985 | Kobayashi et al. | 382/41 |
| 4,574,394 | 3/1986 | Holsztynski et al. | 382/49 |
| 4,581,762 | 4/1986 | Lapidus et al. | 382/22 |
| 4,601,006 | 7/1986 | Liu | 364/726 |
| 4,601,055 | 7/1986 | Kent | 382/49 |
| 4,635,292 | 1/1987 | Mori et al. | 382/41 |
| 4,638,369 | 1/1987 | Hsieh | 382/22 |
| 4,739,476 | 4/1988 | Fiduccia | 364/200 |
| 4,748,676 | 5/1988 | Miyagawa et al. | 382/46 |
| 4,775,952 | 10/1988 | Danielsson et al. | 364/736 |
| 4,847,911 | 7/1989 | Morimoto et al. | 382/22 |

Primary Examiner—David K. Moore
Assistant Examiner—Yon Jung
Attorney, Agent, or Firm—Allen E. Amgott; Paul Checkovich

[57] ABSTRACT

A data processor includes an array of a plurality of processing elements haivng ports connected to neighboring elements. Elements at each end of a column have interconnected ports so that data can be sequentially cycled through the column elements. Elements at each end of a row have switchably interconnected ports so that in one mode data can be sequentially cycled through the row elements. The processor further includes a shift register switchably coupled to each row and memory apparatus coupled to the shift registers. The shift registers are switchable such that in a second mode data can be sequentially cycled through the shift registers and the corresponding row elements. The processor also includes an input shuffle matrix for reformatting data for facilitating data storage and recall during processing, thereby increasing overall system throughput. A method includes storing data in bit planes and shifting data a plurality of bit positions before writing the shifted data to memory, thereby further increasing throughput. Data processing may be used for edge detection from an image including a plurality of picture elements (pixels).

17 Claims, 6 Drawing Sheets

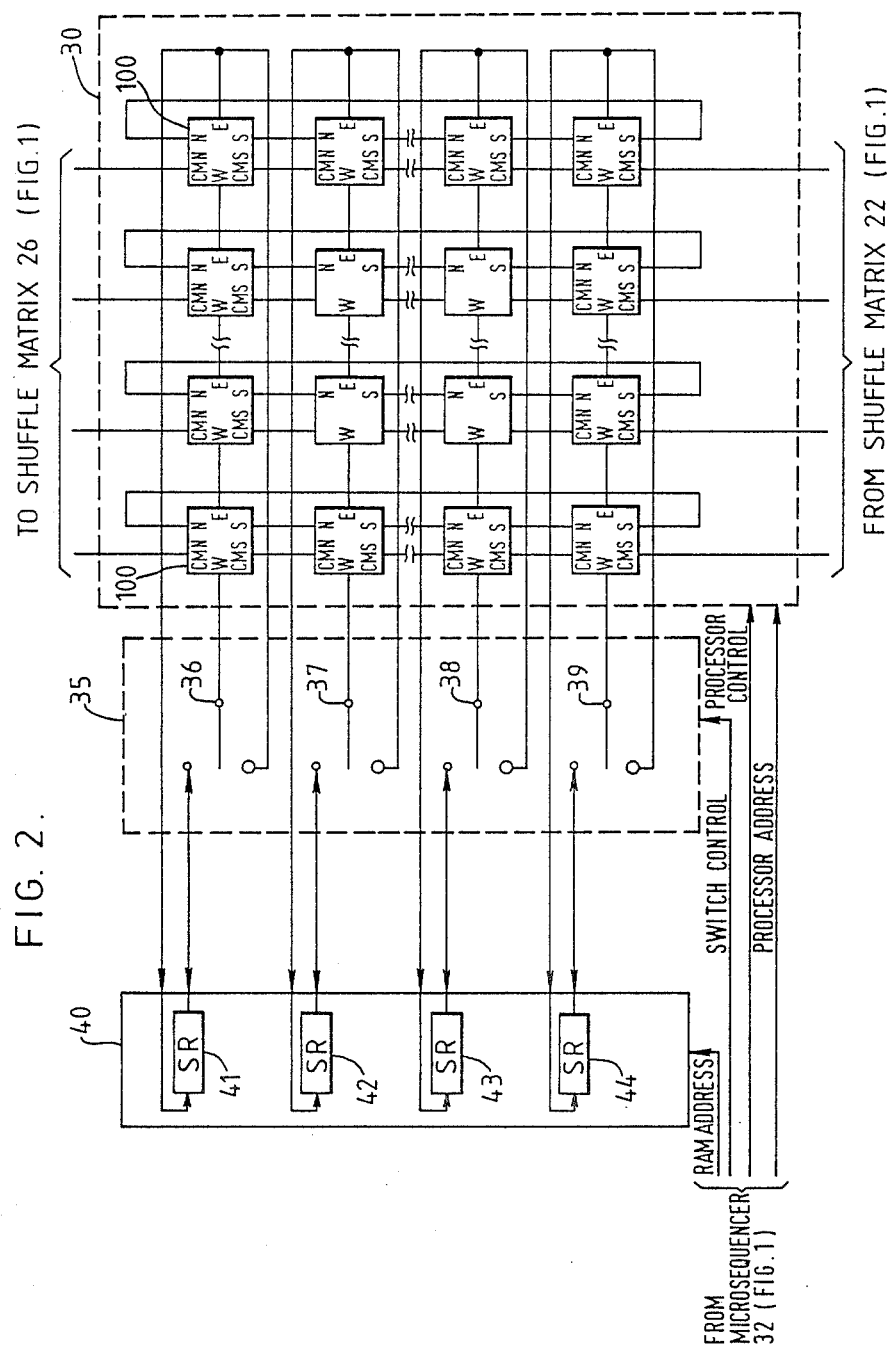

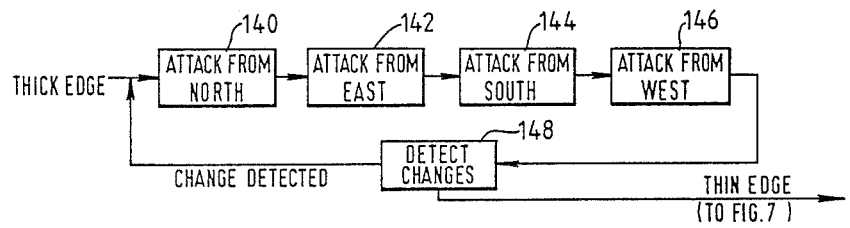
FIG. 6. EDGE THINNING
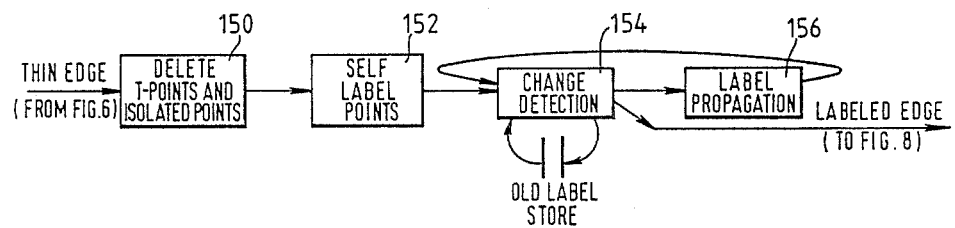
FIG. 7. EDGE CHAIN LABELLING (LINKING)
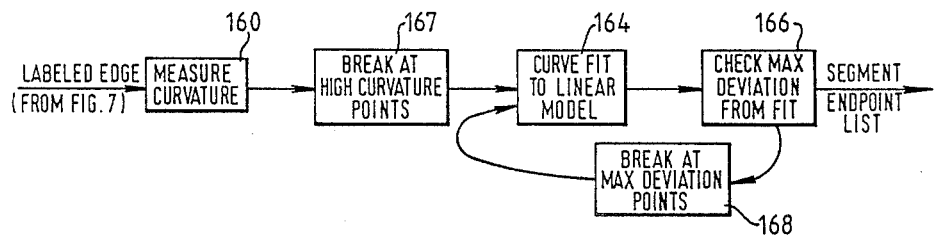
FIG. 8. EDGE SEGMENT EXTRACTION

FEATURE EXTRACTION PROCESSOR

BACKGROUND OF THE INVENTION

This invention relates to a feature extraction processor, and, more particularly, to a processor for performing similar functions in parallel for obtaining picture element (pixel) modulation values from a source of data.

As used herein, feature extraction relates to obtaining shapes and/or contours of objects, such as by identifying edges in an image: which may be camouflaged by background noise and/or texture of the image. For example, in accordance with the present invention, the feature extraction processor may operate on a gray level image for extracting pixel modulation values that define parameterized line segments which represent edges in the image. The sequence of line segments may then be compared to known line segment patterns for identifying objects within the image. Applications for image extraction include: target detection and identification, cartographic data extraction, image data compression, counterfeit detection and parts inspection.

Image feature extraction operations typically are performed at a slow rate when attempted to be run on sequential general purpose computers. A presently employed processing technique may use an existing array processor having a single or several powerful, high-speed arithmetic logic units which operate on data for one pixel at a time. Image pixel modulation data may be stored in a mass memory, such as a semiconductor memory for rapid access, and may be transferred across busses at a rate of about 3 megapixels per second (a typical UNIBUS rate).

Although such a system may be adequate for certain applications, it would be desirable to provide a system having increased throughput and processing capability while maintaining an economic advantage over previously employed systems.

Accordingly, it is an object of the present invention to provide a method and apparatus for more rapidly performing image feature extraction operations over that available using a general purpose computer.

SUMMARY OF THE INVENTION

In accordance with the present invention, a data processor includes a plurality of cells or processing elements each having at least two row ports and two column ports for transmitting and receiving data signals, with each cell having at least one of the two row and column ports connected to a corresponding row and column port of neighboring cells, each cell further for processing data received by the cell on the row and column ports. The rows and columns have an end cell at each end. One end cell of each column has a port connected to a port of the other end cell of the corresponding column such that data may be sequentially passed in a loop including all cells of the corresponding column of cells.

The processor further includes a plurality of switch means with a common terminal connected to a row port of respective one end row cells and a first terminal connected to a row port of respective corresponding other end row cells; a plurality of shift register means having a first port connected to a second switch terminal of corresponding switch means and further having a second port connected to the row port of the respective corresponding other end row cells, and memory means coupled to the plurality of shift memory means for storing data received from the plurality of shift register means and for supplying previously stored data to the plurality of shift register means.

The switch means are operationally functional to connect the respective common terminal and first terminal such that data may be sequentially passed in a loop including all cells of the corresponding row and the corresponding shift register means. The switch means are also operationally functional to connect the respective common terminal and second terminal such that data may be sequentially passed in a loop including all cells of the corresponding row, while bypassing the shift register means.

The processor may further include control means for controlling data flow between the plurality of cells and the memory means. The control means provides a plurality of shift commands for transferring a predetermined number of bits of data followed by a single write command for storing the predetermined number of bits of data in the memory means, thereby increasing the speed of storage over systems using a write command for each data bit to be stored. The combination of the memory means and the shift register means may include a video RAM.

The end cells at one end of the columns further include a port for supplying data and the end cells at the other end of the columns further include a port for receiving data. A first shuffle matrix includes outputs connected to the respective port of the end cells at the other end of the columns and an input for receiving data in a first data word format. The first shuffle matrix rearranges the data to a second word format such that data bits representing the same bit position of each data word are grouped together and provided to the output. A second shuffle matrix means has an input for receiving data from the end cells at the one end of the columns in the second data word format and reorganizes the received data into the first data word format which is available at the output of the second shuffle matrix means. Manipulating data in the second data word format facilitates storage and processing by bit planes.

In another aspect of the present invention, a method for processing digital data includes obtaining digital data to be processed having a first format, rearranging the data bits into a second format having corresponding data bits with the same place value from the digital data grouped together, storing the data words of the second bit format in bit planes, processing data bits by data bit plane for determining a predetermined first function of the data bits of the data bit plane, and reorganizing the data bits of the predetermined function into data words having the first data bit format.

The predetermined first function may include edges in an image, wherein the image includes a plurality of pixels and each pixel is represented by a data word of the first format. Processing further includes determining the response of a pixel data word to a predetermined second function and to the second derivative of the second function from a predetermined number of directions and identifying the pixel as an edge point when both the response to the second function is greater than a predetermined threshold and the response to the second derivative crosses zero for any one of the predetermined directions.

The width of neighboring pixels identified as edge points are thinned to one pixel width while maintaining the connectivity among the remaining pixels. Edge points having no neighboring pixels labeled as edge points or having more than one neighboring pixel identified as an edge point are disregarded from further consideration. Each remaining group of connected edge points are labeled in response to a predetermined characteristic, such as position within the image, of a predetermined one of the edge points of the corresponding group of edge points.

The curvature of each group of connected edge points is determined and a group is separated into first and second groups at a point if the curvature at the point is greater than a predetermined curvature threshold. The group of connected edge points, and first and second points if formed, are approximated by a straight line. The maximum deviation of a group from the straight line is determined and if it is greater than a predetermined deviation threshold, the group is separated into third and fourth sections at the point of maximum deviation. The steps of approximating with a straight line and testing maximum deviation therefrom are repeated until the deviation threshold is not exceeded.

During processing, data may be sequentially transferred in a loop throughout column cells. In one aspect of the invention, data may be sequentially transferred in a loop throughout row cells and in another aspect data may be sequentially transferred in a loop throughout row cells and an associated shift register for each row.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

BRIEF DESCRIPTION OF THE DRAWING

FIG. 2 is a schematic block diagram of a portion of FIG. 1.

FIG. 6 is a schematic block flow diagram of a method for edge thinning in accordance with the present invention.

FIG. 7 is a schematic block flow diagram of a method for edge chain labelling or linking in accordance with the present invention.

FIG. 8 is a schematic block flow diagram of a method for edge segment extraction in accordance with the present invention.

DETAILED DESCRIPTION

Figure 1:
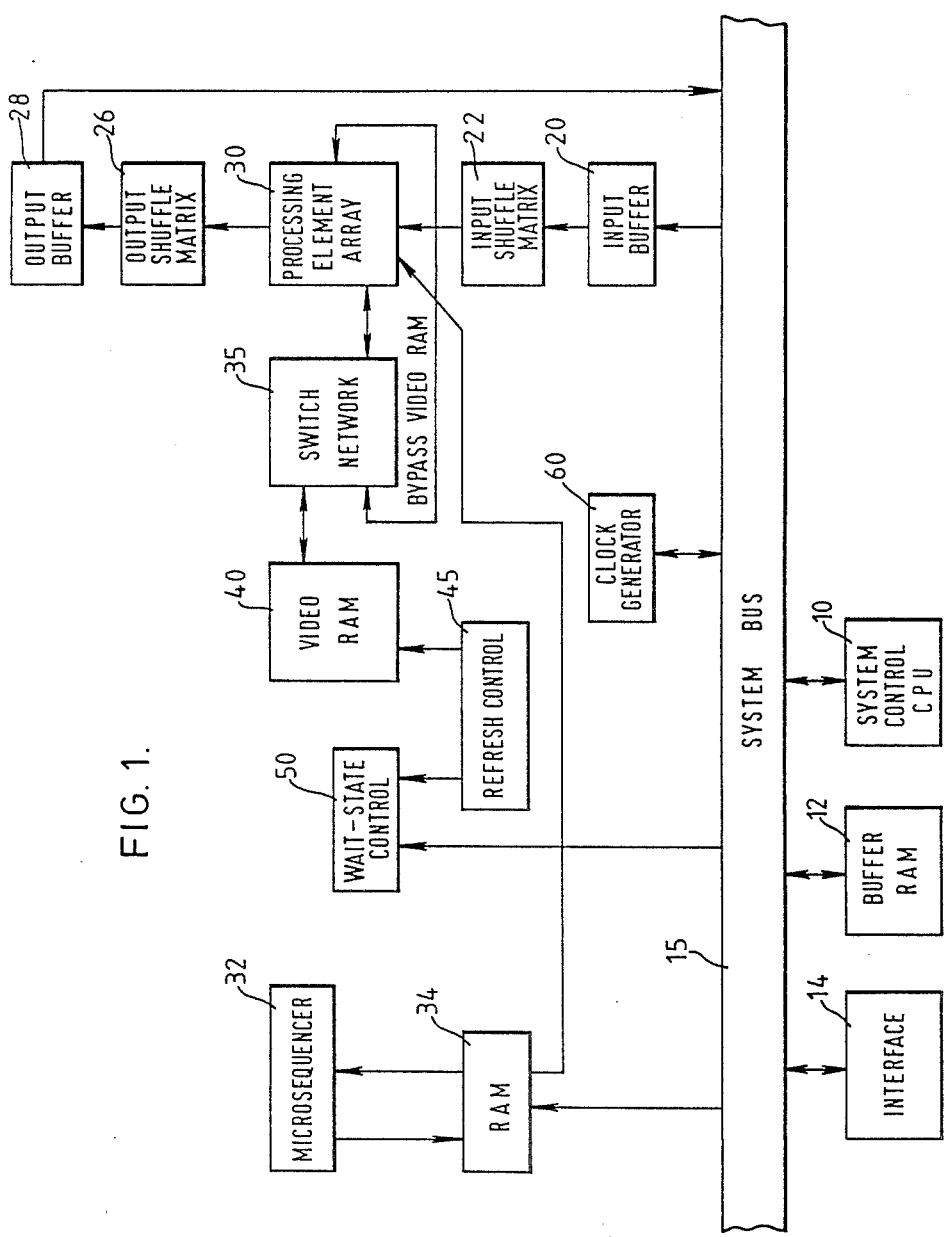
FIG. 1 is a block diagram of a feature extraction processor in accordance with the present invention.

Referring to FIG. 1, a block diagram of a feature extraction processor in accordance with the present invention is shown. By way of illustration and not of limitation, the feature extraction processor will be described as it may be employed to operate on a gray level image for extracting pixel modulation values that define parameterized line segments which represent edges in the image. The developed edges may be compared to known contours for object detection and identification.

The feature extraction processor comprises a system control central processing unit (CPU) 10, a buffer random access memory (RAM) 12, and an interface unit 14, each having a respective input and output coupled to a common system bus 15 for data communication interconnection. System bus 15 may be a VME bus, such as is known in the art.

Interface unit 14 provides an appropriate communication scheme, such as an Ethernet protocol, for obtaining data from, and transferring data to, an external source (not shown). For the present example, image data received from the external source is stored in buffer RAM 12. System control CPU 10, which may include a Motorola model VME-131 single board CPU available from Motorola, Inc., Phoenix, Arizona, controls data flow through the feature extraction processor.

The feature extraction processor further includes an input buffer 20, having an input coupled to system bus 15, an input shuffle matrix 22, a processing element array 30, a switch network 35, a video RAM 40, a micro sequencer 32, an output shuffle matrix 26 and an output buffer 28, having an output coupled to system bus 15. Input buffer matrix 20 has an output coupled to an input of shuffle matrix 22 for supplying image data thereto. Input buffer 20 acts as a rate buffer between system control CPU 10, which may be considered a master, and micro sequencer 32, which may be considered a slave, permitting asynchronous operation between the system components shown above VME bus 15 and below VME bus 15 of FIG. 1.

Input shuffle matrix 22 reorganizes the bits of the image data words received from input buffer 20 into like groups for efficiently transferring the reorganized bits into processing element array 30 and eventually to video RAM 40. Each image data word (8 bits) is indicative of the pixel modulation value for one pixel. For example, in a presently preferred embodiment, four words (each word eight bits long and having bit 0 through bit 7) representing modulation values of four pixels are supplied at one time to shuffle matrix 22. Typically, the bits of one word are grouped together and sequentially arranged from the MSB to the LSB or vice versa. Shuffle matrix 22 rearranges and concatenates the 32 bits starting with the MSB or LSB of each word so that bit 0 from words 1 through 4 are grouped together in a predetermined sequence, such as from the lowest to the highest numbered word, followed by bit 1 from words 1 through 4 in the predetermined sequence, and so forth until bit 7 from words 1 through 4 in the predetermined sequence. Thus the concatenated string may be represented by $0_1, 0_2, 0_3, 0_4, 1_1, 1_2, 1_3, 1_4, \ldots 7_1, 7_2, 7_3, 7_4$—wherein the base number represents the bit position from a word and the subscript indicates the word. Of course in a binary system each bit would have a value of a logical one or a logical zero. This rearrangement or reshuffling of the data bits of the input words facilitates storage and processing of the information as hereinafter explained.

The reshuffled data string of 32 bits is supplied in parallel from an output of shuffle matrix 22 to respective inputs of processing element array 30. Processing element array 30 includes a plurality of processing elements arranged in an array. In a presently preferred embodiment of the present invention, each processing element 100 (shown in FIG. 2) may include a geometric arithmetic parallel processor (GAPP) available from the NCR Corp., Fort Collins, Colo., or the like. A predetermined number of reshuffled data strings from shuffle matrix 22 are shifted into array 30, after which the data strings from array 30 are provided to video RAM 40 through switch network 35. The data strings received by video RAM 40 are stored therein for later recall during processing.

Video RAM 40 may include a model TM4161EP5 video RAM, available from Texas Instruments, Inc., Dallas, Tex., or the like. Video RAM 40 is a dual-ported RAM in which one port is coupled to an internal shift register and the other port is connected as a random access memory port. The shift register port can receive serial data while previously received data is removed from the other end of the shift register. In a presently preferred embodiment, the shift register length is 256 bits so that a picture column of 512 bits can be buffered by two cascaded shift registers. Of course, separate RAM's and shift registers may be appropriately configured by one of ordinary skill in the art for obtaining the functional equivalent of video RAM 40. Use of video RAM 40 is believed to be unique to the system of the present invention inasmuch as typically a video RAM is applied as a buffer in a real-time video processor.

Shifting data into and out of processing element array 30 and maintaining the appropriate status of switch network 35 is controlled by a micro sequencer 32, which may be a model IDT 49C410 micro sequencer available from Integrated Device Technology, Inc., Santa Clara, Calif., or the like. By appropriately addressing RAM 34, micro sequencer 32 enables control signals, such as shift commands, and address information to processing array 30; supplies a control signal for switch network 35., provides an interface between system bus 15 and processing element array 30; and controls the individual processing elements of array 30 through the use of micro programs and instructions all of which are stored in RAM 34. RAM 34 receives the micro programs and instructions from system control CPU 10 via system bus 15. In a presently preferred embodiment, system bus 15 is able to transport data having 32 bits, while RAM 34 is able to store data having a width of 64 bits. Thus, as a micro instruction is received by RAM 34 from bus 15 it can be stored at one storage address, thereby decreasing access time by micro sequencer 32 and decreasing overall processing time of the feature extraction processor, inasmuch as a wider instruction word can command more multiple operations to occur simultaneously.

Clock generator 60 provides timing signals for micro sequencer 32 which are delivered over system bus 15 and through RAM 34. Clock generator 60 may include a model AMD 2925 clock generator available from Advanced Micro Devices, or the like. Wait state control 50 supplies a wait signal to microsequencer 32 which prevents data transfer while video RAM 40 is being refreshed and when input buffer 20 is empty or when output buffer 28 is full.

Refresh control 45 provides a refresh signal to video RAM 40 during the active time of which a wait-state enable signal is supplied to wait-state control 50. For the dynamic video RAM model TM4161EP5, a refresh rate of about 4 milliseconds is recommended. Refresh control 45 includes a counter and a one-shot multivibrator whose period is set to the desired refresh rate and whose output constitutes the output of refresh control 45 that is connected to wait state control 50. The internal stages of the counter of refresh control 45, whose outputs constitute the parallel outputs to video RAM 40, are provided in parallel to video RAM 40 for use as addresses (256 different addresses for 8 stage counter).

In operation, when the multivibrator of refresh control circuitry 45 times out, a wait state command signal is provided to wait-state control circuitry 50 for initiating a wait-state control signal, and, beginning from a reset state, the internal counter (presently 8 bits) starts counting system timing signals. The end of one counter cycle is indicated by a change in state of the counter carry output signal. The change in state of the counter carry output signal resets the multivibrator of refresh control 45 and terminates the wait state.

When processing is complete, data from processing element array 30 is supplied to shuffle matrix 26. Shuffle matrix 26 performs an inverse rearrangement of bits in words from that provided by shuffle matrix 22, so that the data words available at the output of shuffle matrix 26 have the same format and bit orientation as the data words originally received by shuffle matrix 22. Output buffer 28 holds the data words available from the output of shuffle matrix 26 until they are able to be placed on system bus 15. From system bus 15, the data may be sent to another station (not shown) for evaluation and/or further processing.

Referring to FIG. 2, a more detailed schematic block diagram of a portion of FIG. 1 is shown. Processing element array 30 includes a plurality of similar, or identical, processing elements, or cells, 100 that are arranged in a logical two dimensional orthogonal, such as rectangular, array and interconnected to provide a distributed processing network. The array may be extended in any of the logically orthogonal directions as desired. The east (E) port of each element 100 is connected to the west (W) port of its closest eastern neighbor and the north (N) port of each element 100 is connected to the south (S) port of its closest northern neighbor. The N ports of the northernmost (top) elements 100 are connected to the S ports of corresponding southernmost (bottom) elements 100 that are disposed in the respective column.

The W ports of the westernmost elements 100 are connected to a respective common terminal of a switch 36–39 of switch network 35. Switches 36–39 would be of a high speed electronic type. The E ports of the easternmost elements 100 are connected to a respective one terminal of switch 36–39. Each one terminal of switch 36–39 is connectable to the common terminal of the corresponding switch 36–39. The E ports of the easternmost elements 100 are also connected to respective inputs of video RAM 40. Video RAM 40 includes a respective output respectively coupled to another terminal of switch 36–39. Each another terminal of switch 36–39 is connectable to the common terminal of the corresponding switch 36–39. The connection of the one or the other terminal of switch 36–39 to the respective common terminal of switch 36–39 is mutually exclusive.

Each of the northernmost elements 100 includes a register designated as CMN, whose output constitutes a respective output of processing element array 30 when data is moving from south to north through array 30. Each of the southernmost elements 100 includes a register designated as CMS, whose input constitutes a respective input of processing element array 30 when data is moving from south to north through array 30.

Each element 100 also receives a processor control signal, having instructions encoded therein, from micro-processor 32 (FIG. 1). A single instruction provided to each element 100 is operative to cause data to flow uniformly throughout the entire array, thereby implementing a single instruction multiple data (SIMD) format. Hence, where an element 100 is controlled to receive its input from a port having the address S and to transmit its output to a port having the address N, then all elements 100 will be similarly instructed to receive their inputs from respective port S and to provide their outputs to respective port N. Operation between the E and W ports is similarly executed. Elements 100 also each include an arithmetic logic unit (ALU), such as a bit serial full adder-subtractor, for processing binary logic operations, like add and shift. All elements 100 are commanded to perform the same logic operation at the same time, another characteristic of an SIMD architecture. Each element 100 executes the same instruction at the same time on a different pixel of data from the same bit plane. That is, elements 100 may be considered one-bit processors.

In operation, image data from system bus 15 is received by input buffer 20 (FIG. 1), which acts as a rate buffer between control CPU 10 (FIG. 1) and micro sequencer 32 (FIG. 1), and supplies the image data to shuffle matrix 22 (FIG. 1). Shuffle matrix 22 may have input ports directly connected or hardwired to appropriate output ports for reorganizing the input data into a format that is more convenient and that may be more rapidly handled by processing element array 30 and video RAM 40.

A connection scheme for shuffle matrix 22 (Fi. 1) in accordance with the present invention is shown in Table I. The columns under "Connection" indicate the direct connection between the input ports and the corresponding output port. The input data columns list the input word and bit position within the corresponding input word of the image data supplied to the input ports of shuffle matrix 22. The output data columns list the output word and bit position within the corresponding output word of the image data that is provided to processor element array 30 (FIG. 1). As indicated in Table I, whereas input image data is arranged in sequentially increasing bit positions by increasing word number, the output image data is arranged in sequentially increasing groupings of bit positions that are arranged in sequentially increasing order by word number within each group.

TABLE I

| Connection | | Input Data | | Output | Output Data | |
|---|---|---|---|---|---|---|
| Input Ports | Output Ports | Word | Bit | Ports | Word | Bit |
| 1 | 1 | 1 | 0 | 1 | 1 | 0 |
| 2 | 5 | 1 | 1 | 2 | 2 | 0 |
| 3 | 9 | 1 | 2 | 3 | 3 | 0 |
| 4 | 13 | 1 | 3 | 4 | 4 | 0 |
| 5 | 17 | 1 | 4 | 5 | 1 | 1 |
| 6 | 21 | 1 | 5 | 6 | 2 | 1 |
| 7 | 25 | 1 | 6 | 7 | 3 | 1 |
| 8 | 29 | 1 | 7 | 8 | 4 | 1 |
| 9 | 2 | 2 | 0 | 9 | 1 | 2 |
| 10 | 6 | 2 | 1 | 10 | 2 | 2 |
| 11 | 10 | 2 | 2 | 11 | 3 | 2 |
| 12 | 14 | 2 | 3 | 12 | 4 | 2 |
| 13 | 18 | 2 | 4 | 13 | 1 | 3 |
| 14 | 22 | 2 | 5 | 14 | 2 | 3 |
| 15 | 26 | 2 | 6 | 15 | 3 | 3 |
| 16 | 30 | 2 | 7 | 16 | 4 | 3 |
| 17 | 3 | 3 | 0 | 17 | 1 | 4 |
| 18 | 7 | 3 | 1 | 18 | 2 | 4 |
| 19 | 11 | 3 | 2 | 19 | 3 | 4 |
| 20 | 15 | 3 | 3 | 20 | 4 | 4 |
| 21 | 19 | 3 | 4 | 21 | 1 | 5 |
| 22 | 23 | 3 | 5 | 22 | 2 | 5 |
| 23 | 27 | 3 | 6 | 23 | 3 | 5 |
| 24 | 31 | 3 | 7 | 24 | 4 | 5 |
| 25 | 4 | 4 | 0 | 25 | 1 | 6 |
| 26 | 8 | 4 | 1 | 26 | 2 | 6 |
| 27 | 12 | 4 | 2 | 27 | 3 | 6 |
| 28 | 16 | 4 | 3 | 28 | 4 | 6 |
| 29 | 20 | 4 | 4 | 29 | 1 | 7 |
| 30 | 24 | 4 | 5 | 30 | 2 | 7 |
| 31 | 28 | 4 | 6 | 31 | 3 | 7 |
| 32 | 32 | 4 | 7 | 32 | 4 | 7 |

In a presently preferred embodiment, there are 48 rows of processing elements 100 with each row having 36 processing elements. That is, the array has 48 rows and 36 columns.

Each output port of shuffle matrix 22 is connected to a corresponding input of processing element array 30 and which inputs are connected in turn to a CMS register of a corresponding element 100 in sequence starting from the westernmost element 100 in the southernmost row. The outputs from shuffle matrix 22 are connected in sequence starting from the westernmost element 100 in the southernmost row. The inputs to the CMS registers of the four easternmost elements 100 of the southernmost row are left unconnected. Although only four rows of elements 100, four switches 36-39 and four shift registers 41-44 are shown in FIG. 2, it is to be understood that the number of rows (as well as the number of columns), the number of switches and the number of shift registers may be analogously increased for accommodating the desired system requirements.

The southernmost row of elements 100 receives 32 bits (i.e. four eight-bit words) at the respective CMS register inputs, which constitute corresponding inputs of processing element array 30, in the form of rearranged image data words from shuffle matrix 22 (FIG. 1). The data word in the southernmost row of elements 100 is shifted from the CMS to the CMN register internal to each element 100 and then to the corresponding CMS register of the nearest neighboring northern row of elements 100 while another rearranged data word from shuffle matrix 22 (FIG. 1) is transferred to elements 100 of the southernmost row of element array 30. Shifting and transferring data among input buffer 20, shuffle matrix 22, processing element array 30 and elements 100 of array 30 are performed in response to control signals from micro sequencer 32 (FIG. 1). Use of video RAM 40 in accordance with the present invention, permits a typical 60 megapixel per second transfer rate between video RAM 40 and array 30 without having to use system bus 15 (FIG. 1).

Supply of rearranged data from shuffle matrix 22 to array 30 and corresponding northern shift of the rearranged data through elements 100 of array 30 are continued to be performed until every row (48 in a presently preferred embodiment) of elements 100 contains a rearranged image data word.

After all rows of elements 100 have received a data word, the data bits in the four westernmost columns of elements 100 of array 30 are loaded into video RAM 40 through switch network 35 a bit plane at a time. A bit plane contains the bit values of a bit having the same relative position in all the data words. Thus, bit plane 0 will contain the value of the 0 bit of all data words arranged in a predetermined order. Bit plane ordering has been facilitated by use of shuffle matrix 22 (FIG. 1).

In order to accommodate data transfer from processing element array 30 to video RAM 40 during data loading operations, switches 36 to 39 of switch network 35 are commanded by the switch control signal from micro sequencer 32 (FIG. 1) to connect the respective common terminal to the terminal (upper one) connected to an input of video RAM 40.

Figure 3A:
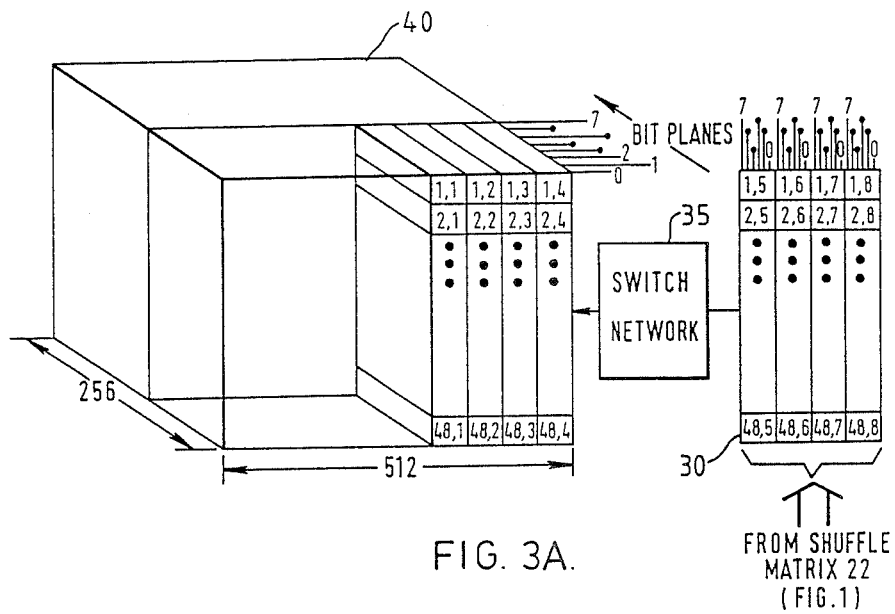
FIGS. 3A and 3B are block diagrams of a portion of the data flow of FIG. 1.

Referring to FIG. 3A, a schematic block diagram including data structures of FIG. 2 is shown. Once all rows of array 30 have been loaded with data from shuffle matrix 22, the data can be transferred to video RAM 40. Video RAM 40 is organized as a stack of forty-eight $256 \times 512$ bit memory arrays. A bit plane is represented as a $48 \times 512$ bit slice of the stacked memory array.

Data transfer from array 30 to video RAM 40 is performed in response to commands from micro sequencer 32 (FIG. 1). Data residing in a CM(S or N) register of element 100 (FIG. 2) is transferred to a respective EW register that is an internal component of each element 100. Data in the EW register may be shifted in either the east or west direction from element 100.

Figure 3B:
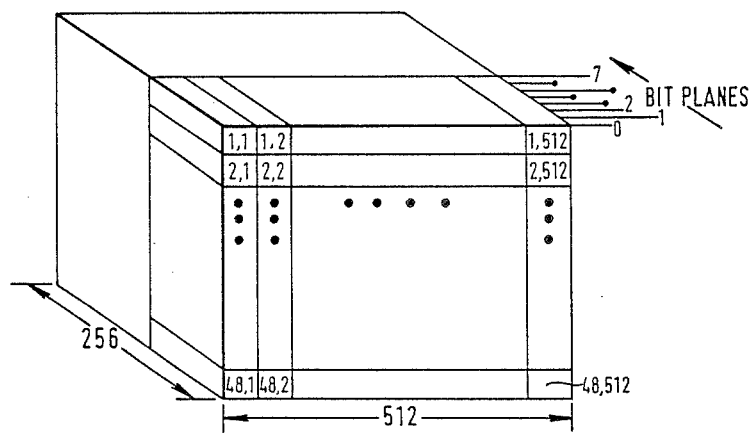

Due to the operational requirements of the presently preferred video RAM 40, four columns of data are transferred west to video RAM 40 at a time. Shown in FIG. 3A is the result after the first four words have been shifted from array 30 to video RAM 40. The words are identified by m,n wherein m indicates the row and n indicates the column of the ultimate position of the word when video RAM 40 is fully loaded as shown in FIG. 3B. The bits of each word are arranged by bit plane, or bit position, in the 256 bit direction. Thus video RAM 40 as presently configured can store $512 \times 48 \times (256/8) = 786{,}432$ words, or pixel modulation values.

In order to transfer data from array 30 to video RAM 40, data in each internal CMS or CMN register of elements 100 (FIG. 2) are transferred to a corresponding east-west (EW) internal register of respective element 100. While data from array 30 are being transferred west to video RAM 40, additional data from shuffle matrix 22 (FIG. 1) may be shifted north through CMS and CMN registers of elements 100 (FIG. 2) as previously described. The north loading of array 30 and west storing of video RAM 40 may be repeated until video RAM 40 is full.

One advantage of using the model TM4161EP5 video RAM as described above is that each storage section is coupled to, and may be accessed through, one of a shift register 41 to 44 (FIG. 2) that is packaged with the memory section.

Using shift registers 41-44 for buffering data transfer from array 30 to video RAM 40 increases system operational speed over a system that uses read/write commands for storing data in and retrieving data from memory, inasmuch as a shift command requires less time to execute than a read or write command. The present system uses four shift commands followed by one write command for storing four bits of data.

Referring again to FIG. 2, shift registers 41 to 44 include a serial port at each end and a plurality of parallel access ports (not shown) (one parallel access port for each section of shift register 41 to 44) that are coupled to respective memory sections. For operation with video RAM 40 shown in FIGS. 3A and 3B, forty-eight 512-bit shift registers, one for each row and each having a parallel port coupled to a respective storage location of the row, would be required.

As data are shifted from array 30 to video RAM 40, they are sequentially shifted west through switch network 35 and into shift registers 41 to 44. After the desired number of westward data bit shifts has occurred, the data bits from the parallel ports of shift register 41 to 44 are stored in the corresponding memory sections of video RAM 40.

Once the input data from system bus 15 (FIG. 1) has been stored in video RAM 40, the stored data can be accessed and processed without having to interface with system bus 15, thereby saving additional time during operation. Further, intermediate computational values may be stored in video RAM 40 as desired without communication over system bus 15.

Switch network 35 permits two basic computational modes during operation. When the common terminal of switches 36 to 39 is connected to the upper terminal of the respective switch, which connects the W port of westernmost elements 100 to a corresponding serial port of shift registers 41 to 44, while the other serial port is connected to the E port of a corresponding easternmost element 100, data may flow in either the east or west direction through array 30 and shift registers 41 to 44. For example, for accessing data stored in video RAM 40, the data are placed by bit plane order on the parallel ports of shift registers 41 to 44 and shifted east a number of times corresponding to the number of elements 100 in a row. After all elements 100 have been supplied with a respective data bit from video RAM 40, processing by elements 100 of array 30 in response to commands from micro sequencer 32 (FIG. 1) may begin. Each element 100 includes means such as an arithmetic logic unit (ALU) for performing signal processing functions on the data received. All elements 100 receive the same instruction at the same time, thus implementing a single instruction multiple data (SIMD) format. Likewise, intermediate data values may be transferred through switch network 35 to video RAM 40 for storage and later recall.

When the common terminal of switches 36 to 39 is connected to the lower terminal of the respective switch, the W port of westernmost elements 100 is directly connected to the E port of easternmost elements 100 of the respective row, so that all east-west data shifts cycle only through elements 100 of the corresponding row of array 30, thereby bypassing video RAM 40. For both modes of operation, the N port of the northernmost elements 100 is directly connected to the S port of southernmost elements 100 of the respective column, so that all north-south data shifts cycle through elements 100 of the corresponding column of array 30.

Using the configuration of elements 100 shown in FIG. 2, a non-orthogonal data transfer, such as north-east, north-west, south-east or south-west, requires two shifts. For example, a north-east transfer may be accomplished by a north shift followed by an east shift, or by an east shift followed by a north shift. With another configuration of elements 100, such as for example that shown and claimed in U.S. Pat. No. 4,739,476—Fiduccia, which is assigned to the present assignee, and which configuration may be used in array 30, a non-orthogonal data transfer may be effected by a single shift, resulting in additional saving of time.

Referring again to FIG. 1, when processing is complete, the resultant data from video RAM 40 may be transferred to array 30 if they are not already in array 30. Each element 100 (FIG. 2) having data in an EW register or a NS register transfers the data to the corresponding CMN register and the data are shifted north through the CMS and CMN registers, as hereinbefore described, to shuffle matrix 26.

Shuffle matrix 26 performs an inverse function to shuffle matrix 22 for rearranging data so that the data available from shuffle matrix 26 is in the format originally received by shuffle matrix 22 from system bus 15. Shuffle matrix 26 may include the same internal circuitry as shuffle matrix 22 with the inputs and outputs reversed. The output of shuffle matrix 26 supplies the rearranged output data to output buffer 28. Buffer 28 provides a rate buffer between system control CPU 10 and micro sequencer 32, thereby permitting asynchronous operation between micro sequencer 32, along with the components it controls, and system bus 15. From the output of output buffer 28, the data are supplied to system bus 15, from which they may be sent to other stations (not shown) for analysis or further processing as desired.

One specific environment in which the system of the present invention has been found useful is edge detection. Edge detection is used to identify pixels within an image, wherein the brightness undergoes a step change in intensity relative to neighboring pixels. These step changes delimit boundaries or edges between different regions of the image. The edges so determined can be highlighted or intensified for aiding a human interpreter in identifying features of the image, or the edges can be provided to an electronic image recognition system having a stored plurality of predetermined patterns for comparison and ultimate identification.

An edge detector that may be beneficially employed with the present invention is similar to one described in an article "Finding Edges and Lines in Images" by J. F. Canny, MIT Artificial Laboratory Report II AI-TR-720, Cambridge, Mass. (June 1983). An edge enhancer described by Canny is of the form $$h(x,y) = G(x)G'(y)$$

wherein, x is the number of pixels of displacement from the center of a kernel parallel to the expected edge direction;

y is the number of pixels of displacement from the center of the kernel perpendicular to the expected edge direction;

h (x,y) is a convolution kernel function;

G (x) is a Gaussian function defined by $$G(x) = \exp\left(\frac{-x^2}{2\sigma^2}\right)$$

and sigma ($\tau$) is a scaling factor which characterizes the scale at which detection is performed; and a prime (') used after a function of one variable denotes the derivative of the function.

Figure 4A:
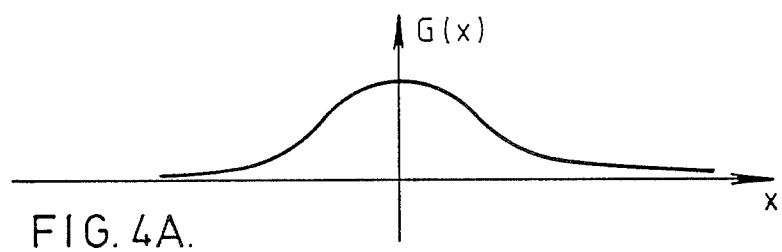
FIGS. 4A-4C are graphs of edge detecting operators for the Canny algorithm in accordance with the present invention.
Figure 4B:
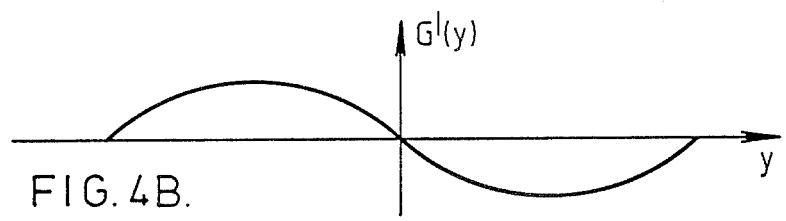
Figure 4C:
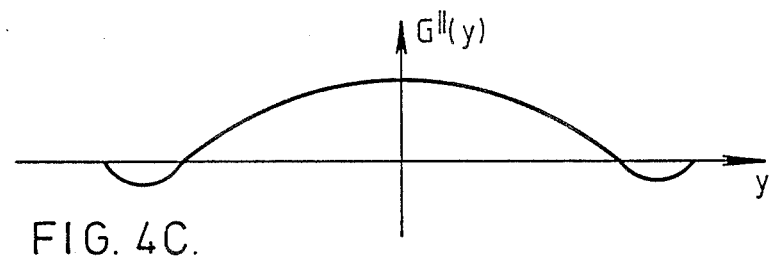

Referring to FIGS. 4A–4C, edge detecting operators, in accordance with the present invention are shown. FIG. 4A represents a Gaussian function G(x), FIG. 4B represents a mask, or a Gaussian derivative G'(y), and FIG. 4C represents a mask, or a Gaussian second derivative G"(y).

The curves of FIGS. 4A and 4B may be used as edge operators in accordance with the equation $h(x,y) = G(x).G'(y)$ of a convolution mask, wherein in a presently preferred embodiment (x,y) indexes a matrix of from 7×7 to 15×15 pixels of the image.

The mask represented by FIGS. 4A and 4B responds by supplying a peak positive output when it is lined up with an edge of a predetermined orientation in the direction of the mask and by supplying a peak negative output when it is lined up with an edge rotated 180° from the predetermined orientation in the direction of the mask. Inasmuch as it is generally easier to search for zero crossings than for local maxima and minima directly (especially when processing pixels in parallel), a convolution mask having an equation of the form $k(x,y) = G(x).G''(y)$, such as shown by FIGS. 4A and 4C, that produces outputs in response to the derivative of the mask represented by FIGS. 4A and 4B may also be used.

The edge operators are represented by the graphs of FIGS. 4A and 4B, and the derivative operators are represented by the graphs of FIGS. 4A and 4C. The function of FIG. 4A focuses attention to the center of the kernel as the pixels from the image pass across the function, while the function of FIG. 4B emphasizes a step change in intensity perpendicular to the direction of the edge, and the function of FIG. 4C finds local maxima in the edge response.

A pixel may be identified as potentially representing a portion of an edge if it satisfies the following conditions. The edge derivative response crosses zero at the pixel (indicating a local maximum or minimum in the edge response), and the absolute value of the edge response is above a predetermined threshold (for screening out slow transitions and noise induced variation).

Since the convolution masks represented by the equations above do have directionality, it is necessary to apply the masks to the matrix of pixels under test from different directions i order to detect all edge points. Four directions designated north-south, east-west, northeast-southwest and northwest-southeast may be used. A pixel satisfying the above conditions so that it is identified as potentially representing a portion of an edge is designated an edge point if it satisfies the conditions above in one of the four directions.

Figure 5:
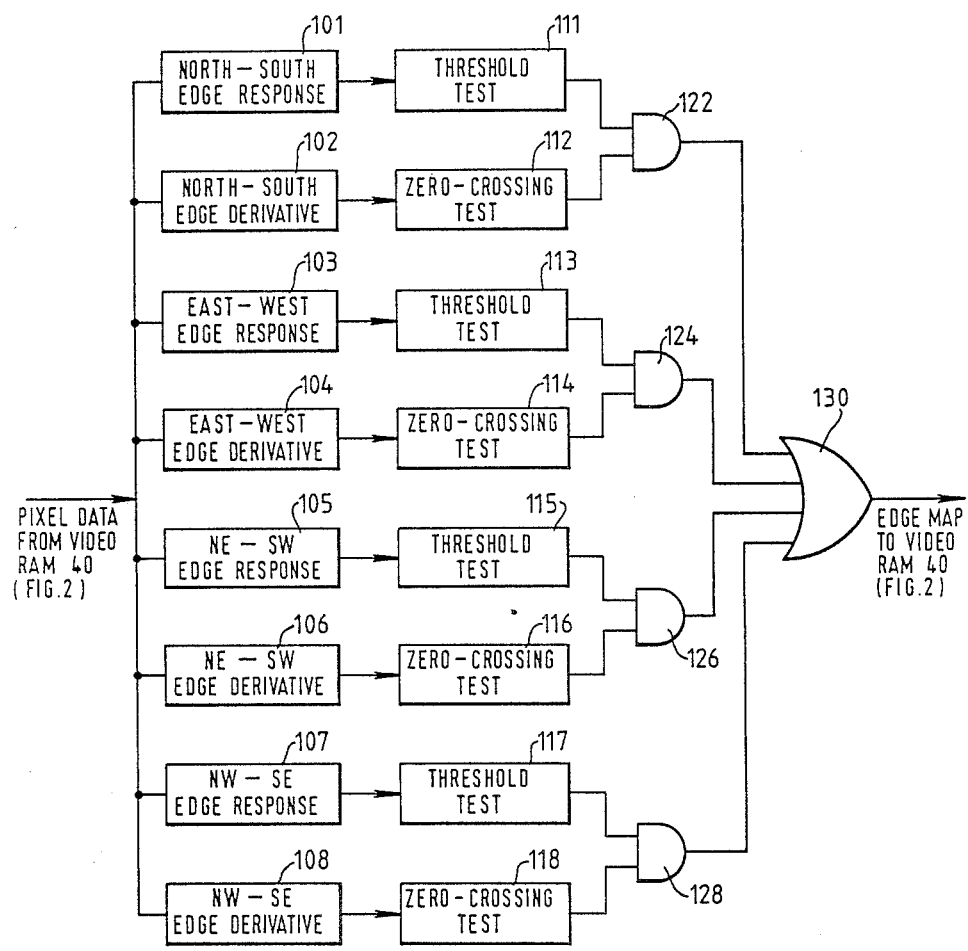
FIG. 5 is a schematic block diagram of a method for processing pixels of an image for determining edges in the image in accordance with the present invention.

Referring to FIG. 5, a schematic block diagram of a method for processing pixels of an image for determining edges in the image in accordance with the present invention is shown. The method shown schematically in FIG. 5 determines if a pixel satisfies the conditions for declaring the pixel an edge point.

The edge response of a pixel is determined for each of four directions by edge response circuitry 101, 103, 105 and 107 (hereinafter 101–107), respectively, and the edge derivative of the pixel is determined for each of the same four directions by edge derivative circuitry 102, 104, 106 and 108 (hereinafter 102–108), respectively. The determined edge response available from the output of each of edge response circuitry 101–107 is supplied to a corresponding threshold test circuitry 111, 113, 115 and 117 (hereinafter 111–117), respectively, and the determined edge derivative available from the output of each of edge derivative circuitry 102–108 is supplied to a corresponding zero-crossing test circuitry 112, 114, 116 and 118 (hereinafter 112–118), respectively.

The outputs of threshold test 111 and zero-crossing test 112 are connected to respective inputs of an AND gate 122 having an output coupled to an input of OR gate 130. Threshold test circuitry 111 determines whether the north-south edge response signal available from the output of edge response circuitry 101 is above a predetermined threshold. If it is above the predetermined threshold, then a signal indicative of the true state is supplied to an input of AND gate 122. Otherwise, a signal indicative of the false state is supplied to the input of AND gate 122. Zero-crossing test circuitry 112 determines whether the north-south edge derivative signal available from the output of edge response circuitry 102 crosses zero. If it does cross zero, then a signal indicative of the true state is supplied to another input of AND gate 122. Otherwise, a signal indicative of the false state is supplied to the another input of AND gate 122 from test circuitry 112. Only when both inputs to AND gate 122 are in the true state does AND gate 122 provide a signal having a true state to an input of OR gate 130. Otherwise, the signal from AND gate 122 to OR gate 130 is in the false state.

In a similar manner, the edge response/threshold test and edge derivative/zero-crossing test for the three other directions are determined. Any input signal to OR gate 130 having a true state causes the output of OR gate 130 to provide a signal identifying the pixel under test as an edge point.

The data flow and processing shown in FIG. 5 must be performed for each pixel of an image to which the edge detector algorithm is applied. By assigning each pixel or small group of pixels to a different processor, such as element 100 (FIG. 2), which may all be operated concurrently using a SIMD scheme as previously described, the speed with which the ultimate solution of the edge detector algorithm may be obtained in increased over systems using a general purpose computer programmed for processing the pixels of the image. That is, all processing that is performed on a pixel in accordance with the method schematically shown in FIG. 5 may be performed by an element 100 (FIG. 2) under control of microsequencer 32 (FIG. 1) with pixel data available from edge map data stored in the video RAM 40 (FIG. 2).

Referring to FIG. 6, a schematic block flow diagram of a method for edge thinning in accordance with the present invention is shown.

There are tradeoffs which can be made in the edge detection process previously described in conjunction with FIGS. 4 and 5. The parameter signal ($\tau$) in the Gaussian functions can be varied or the value of the threshold of threshold test circuitry 111–117 (FIG. 5) can be varied.

Varying the threshold of test circuitry 111–117 (FIG. 5) permits a trade-off between probability of edge detection (greater as threshold is lowered) versus probability of false alarm or false edge indication (lesser as threshold is increased). It is desirable to avoid having the image identification or categorization system (not shown) unnecessarily infer the presence of many edge points that were missed during edge detection processing or to consider many extraneous region boundaries that were falsely identified during edge detection.

A symptom of having the threshold of test circuitry 111–117 (FIG. 5) set too high or of having scale parameter sigma ($\tau$) set too wide is the identification of thick edges. That is, edges greater than one pixel in width. Detected edges may be computationally efficiently thinned to one pixel in accordance with the present invention without affecting the length or topology of the edges. Thus, a low threshold may be set in test circuitry 111–117 (FIG. 5) which minimizes the probability of missed edge detection.

Pixels within a 3×3 pixel neighborhood of a predetermined pixel PO may be identified as follows:

| P4 | P3 | P2 |
|----|----|----|
| P5 | PO | P1 |
| P6 | P7 | P8 |

Attack blocks 140, 142, 144 and 148 (hereinafter 140–148) represent processing from the indicated direction, i.e. north, east, south and west, respectively to determine if pixel PO should be deleted from the edge. The attack from the west step 146 is performed by processing the following Boolean equation:

$$PO' = PO P1 \overline{P5} (\overline{P3 P7 P8} + \overline{P7 P3 P2} + \overline{P2 P8})$$

where PO' is the updated value of the center pixel. The attacks from the other directions represented by steps 140, 142 and 144 are performed by rotating the Boolean equation clockwise 90° about PO. The edge is repeated by sequentially attacked from all four sides until no change takes place in PO as detected in step 148.

Referring to FIG. 7, a schematic block flow diagram of a method for edge chain labelling or linking in accordance with the present invention is shown.

The identification of a single pixel PO is passed from the detect change step 148 of FIG. 6, when no change is detected between the value of PO during two successive iterations of the edge thinning process, to delete T-points and isolated points step 150. Execution of step 150 eliminates all edge points from further consideration which have either no neighbors which are also marked as edge points, i.e. isolated points, or more than two neighbors marked as an edge point, i.e. T-points. This is done because isolated points are not useful for image segmentation and T-points introduce confusion and may affect uniqueness of solution when attempting to map or compare edges to simple curves. Eliminating the isolated points and T-points from further consideration ensures that each connected edge formed from respective predetermined plurality of the remaining points will be able to be mapped into a unique simple curve.

After performing step 150, execution of step 152 labels each point based on the respective coordinates of the point. Each point is labelled according to the following equation:

*label = col + nrcols\*row,* wherein "label" is the self-label assigned to the point (pixel), "col" is the column number of the pixel (0–511), "row" is the row number of the pixel (0–511) and "nrcols" is the number of columns of pixels in the image. The numbers in parentheses represent the possible values for the example given above with respect to FIGS. 2, 3A and 3B. After all points have been labelled, the non-edge points (i.e. isolated points and T-points) have their labels set to a value which is greater than the value of a permissible edge point label so that they will no longer be considered. Performing step 154, the current label assigned to a pixel is compared with the immediately preceding value of the label assigned to the same pixel (which immediately preceding label had been stored in an appropriate storage medium, such as RAM). If a change in label is detected by performance of step 154, execution of step 156 compares the value of the label of the edge point under consideration with the value of the labels of each of its four-neighbors. The value of the label of the pixel in the four-neighbor neighborhood having the lowest value is substituted for the value of the label of the pixel under consideration and step 154 is repeated using the substituted label. In this way, by repeating step 154 and 156 as necessary until no change is detected at step 154, eventually every pixel on a connected edge will have been assigned the self-label of the uppermost, most left (or northernmost, most western) pixel in the edge. Because only one edge can contain a pixel, each edge is thereby uniquely labelled. When no change is detected after the performance of step 154, the labelled edge is made available for processing by execution of step 160 (FIG. 8).

Referring to FIG. 8, a schematic block flow diagram of a method for edge segment extraction in accordance with the present invention is shown. Edge segment extraction is used to ensure that the edges of an image are represented by a series of line segments which do not deviate excessively from the true edge locations.

Execution of step 160 determines the curvature of the edge at each edge point and performing step 162 breaks the edge at all points where the curvature is greater than a predetermined curvature threshold. This is necessary to prevent trying to fit a line segment to a curve or portion of a curve that has a sharp turn, such as a corner, for example. When a curve is broken, the labels are repropogated, such as by using the processing of steps 154 and 156 of FIG. 7.

After relabelling, if necessary, execution of step 164 computes a best straight-line, or fit line, approximation to the points forming the edge segment using a least-squares criterion.

Performance of step 166 determines the point of maximum deviation between the fit line found by step 164 and the edge being approximated by the fit line. The value of the deviation at the point of maximum deviation is compared with a predetermined deviation threshold. If it is less than the predetermined deviation threshold, then the edge is represented by its endpoints which may be passed for object identification as hereinbefore described.

If the value of the deviation at the point of maximum deviation does exceed the predetermined deviation threshold, the execution of step 168 breaks the edge segment into two edge segments at the maximum deviation point, relabels each member of the broken edge segment, such as by performance of steps 154 and 156, and proceeds to repeat step 164 for assigning a fit line to each member of the broken segment. Steps 164, 166 and 168 are repeated until the point of maximum deviation between the fit line and the edge segment or member of a broken segment is less than the predetermined deviation threshold. Thus, the overall effect of edge segment extraction is to break a curve (edge segment) into small enough members so that a series of fit lines that accurately represent the original curve may be determined. The fit lines are identified by their end points.

RAM 239 receives address from micro sequencer 32 (FIG. 1) for identifying from where registers 221, 223, 225 and 227 and RAM 239 will receive respective input information. Because the same twelve control signals ($C_0$–$C_c$) and the same eight RAM addresses ($A_0$–$A_7$) are provided to each element 100, each element 100 will perform the same function when commanded, thus constituting a single instruction multiple data (SIMD) system.

Thus has been illustrated and described a method and apparatus for more rapidly performing image feature extraction operations, such as determining edges, over that available using a general purpose computer.

What is claimed is:

1. A data processor, comprising:
   a plurality of cells each including at least two row ports and two column ports for transmitting and receiving data signals, each cell having at least one of the two row ports and two column ports connected to a corresponding row and column port of neighboring cells, each cell further for processing data received by the each cell on the row and column ports;
   each column having first and second end cells at respective ends of the column and one of the column ports of the first end cell connected to one of the column ports of a corresponding second end cell of the column such that data may be sequentially passed in a loop including all cells of the corresponding column of cells, and each row having a first and second end cell at respective ends of the row;
   a plurality of switch means each of the switch means having a common terminal connected to a row port of a corresponding first end cell, each switch means further having a first terminal connected to a row port of a corresponding second end cell, each switch means having a second terminal;
   a plurality of shift register means, each of the shift register means having a first port connected to the second switch terminal of a corresponding switch means and further having a second port connected to the row port of the corresponding second end cell; and
   memory means coupled to the plurality of shift register means, the memory means for storing data received from the plurality of shift register means and for supplying previously stored data to the plurality of shift register means,
   wherein each switch means is operationally functional to connect the respective common terminal and first terminal such that data may be sequentially passed in a loop including all cells of the corresponding row and the corresponding shift register means and further operationally functional to connect the respective common terminal and second terminal such that data may be sequentially passed in a loop including all cells of the corresponding row while bypassing the corresponding shift register means.

2. The data processor as in claim 1, further including control means for controlling data flow between the plurality of cells and the memory means, the control means providing a plurality of shift commands for transferring data from rows of cells to the corresponding shift register means followed by a write command for transferring data from the corresponding shift register means to the memory means.

3. The data processor as in claim 1, wherein the memory means and the plurality of shift register means include a video random access memory.

4. The data processor as in claim 1, wherein each of the first end cells of the columns includes an output for supplying data from the corresponding first end cell and each of the second end cells of the columns includes an input for receiving data by the corresponding second end cell, the data processor further including:

first shuffle matrix means having a plurality of outputs and an input, the plurality of outputs respectively coupled to respective inputs of the second end cells of the columns, the first shuffle matrix for reorganizing bits of data in first data word format such that bits representing the same bit position within each data word are grouped together to form bits of data in second data word format; and second shuffle matrix means having a plurality of inputs and an output, the plurality of inputs respectively coupled to respective outputs of the first end cells of the columns, the second shuffle matrix for reorganizing bits of data in the second data word format such that the bits are ordered in the first data word format.

5. The data processor as in claim 4, further including:
input buffer means having an output coupled to the input of the first shuffle matrix and an input for receiving data at a first data rate, the input buffer means for supplying the received data to the first shuffle matrix at a second data rate, thereby buffering input data flow to the processor; and output buffer means having an input coupled to the output of the second shuffle matrix and an output, the output buffer means for making available data received at the input from the second shuffle matrix at the second data rate to the output of the buffer means at the first data rate, thereby buffering output data flow from the processor.

6. The data processor as in claim 1, wherein each of the first end cells of the columns includes an output for supplying data from the corresponding firstend cell and each of the second end cells of the columns includes an input for receiving data by the corresponding second end cell, each cell further including a plurality of registers internally connected to row and column ports and an arithmetic logic unit for processing data by the cell, wherein a set of data may be processed while another set of data is being transferred among the cells.

7. A method for processing digital data, comprising:
obtaining the digital data to be processed, the digital data including a plurality of data words, each data word having data bits arranged in a predetermined first data bit sequence in response to the place value of the data bits for forming a first data bit format;

rearranging the data bits of the data words into a second data bit format, the second data bit format having corresponding data bits with the same place value from the data words grouped together, data bits within each group of data bits having the same place value arranged in a predetermined second data bit sequence in response to the data word of the first data bit format from which the data bit came;

storing the data words of the second bit format in bit planes, wherein a data bit plane includes data bits having the same place value of data words having the first data bit format;

processing data bits by data bit plane for determining a predetermined first function of the data bits of the data bit plane, the predetermined first function represented by data bits in the second data bit format;

reorganizing the data bits of the predetermined first function into data words having the first data bit format, wherein the step of storing includes:

supplying the data words of the second bit format to a bit processor array, the bit processor array including a plurality of cells connected to neighboring cells for forming a predetermined number of rows and columns of cells, data bits of the data words of the second bit format supplied to respective columns of cells, the cells including a respective arithmetic logic unit;

shifting a predetermined plurality of data bits having at least two different place values of the second bit format in a predetermined direction along the rows of the array in response to a plurality of shift commands; and storing the predetermined plurality of shifted data bits in response to a single write command.

8. The method as in claim 7, wherein the step of processing is performed concurrently with the steps of supplying, shifting and storing the predetermined plurality of shifted data bits.

9. The method as in claim 7, wherein the step of shifting further includes shifting the predetermined plurality of data bits into shift register means, the shift register means coupled to memory means.

10. The method as in claim 9, wherein a port of the cell at one end of each column of cells is connected to a port of the cell at the other end of the corresponding column, and a port of the cell at one end of each row of cells is switchably connected to a port of the cell at the other end of the corresponding row and to a port of a corresponding shift register, the corresponding shift register having another port switchably connected to the port of the cell at the other end of the corresponding row, the step of processing further including:

sequencing data bits in a first loop through columns of cells;

sequencing data bits in a second loop through rows of cells when the port of the cell at the one end of each row is operationally connected to the port at the other end of the corresponding row; and sequencing data bits in a third loop through rows of cells and corresponding shift registers when the another port of the corresponding shift register is operationally connected to the port of the cell at the other end of the corresponding row, thereby facilitating data bit and intermediate processing data bit storage and retrieval.

11. The method as in claim 7, wherein the predetermined first function includes edges in an image, the image including a plurality of pixels, each pixel represented by the respective data word of the first bit format and the step of processing further includes:

determining the response of a pixel data word to a predetermined second function and to the second derivative of the predetermined second function from a predetermined number of directions;

identifying the pixel as an edge point when both the response to the second function is greater than a predetermined threshold and the response to the second derivative of the second function crosses zero for any one of the predetermined directions.

12. The method as in claim 11, further including the step of thinning the width of neighboring pixels identified as edge points to one pixel width while maintaining the connectivity among the remaining pixels.

13. The method as in claim 12, further including:

disregarding edge points having no neighboring pixels which are also identified as edge points;

disregarding edge points having more than one neighboring pixel identified as an edge point; and labelling each group of connected edge points in response to a predetermined characteristic of a predetermined one of the edge points of the corresponding group of remaining edge points.

14. The method as in claim 13, further including:

determining the curvature of each group of remaining edge points;

separating a group of remaining edge points into first and second separated groups of edge points at a separation point when the curvature at the separation point is greater than a predetermined curvature threshold;

approximating the group of remaining edge points, first separated group of edge points and second separated group of edge points by a straight line.

15. The method as in claim 14, wherein the steps of determining the curvature and separating are repeated for the first and second separated groups and the step of approximating is repeated for each group formed by the repeated separating step.

16. The method as in claim 14, further including:

determining the point of maximum deviation of the straight line from the corresponding group of edge points;

separating the corresponding group of edge points into third and fourth separated groups of edge points at the point of maximum deviation when the maximum deviation is greater than a predetermined deviation threshold;

approximating the third and fourth separated groups of edge points by a respective straight line.

17. The method as in claim 16, further including repeating for the third and fourth separated groups the steps of determining the point of maximum deviation, separating the group of edge points and approximating the third and fourth separated groups.

* * * * *